(12) United States Patent
Hirasawa

(10) Patent No.: US 6,493,019 B1
(45) Date of Patent: *Dec. 10, 2002

(54) IMAGE FORMING APPARATUS

(75) Inventor: Hideaki Hirasawa, Shizuoka-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/489,945

(22) Filed: Jan. 24, 2000

(30) Foreign Application Priority Data

| Jan. 29, 1999 | (JP) | 11-022214 |
| Feb. 3, 1999 | (JP) | 11-026337 |
| Feb. 10, 1999 | (JP) | 11-033411 |

(51) Int. Cl.$^7$ .............................. B41J 2/47; B41J 2/435
(52) U.S. Cl. ........................ 347/233; 347/232; 347/249
(58) Field of Search .................. 347/233, 235, 347/248, 250, 249, 116, 117, 232

(56) References Cited

U.S. PATENT DOCUMENTS

| 5,426,528 A | * | 6/1995 | Yamamoto et al. | ...... 347/235 X |
| 5,881,346 A | * | 3/1999 | Mori et al. | ............. 347/116 X |
| 6,052,143 A | * | 4/2000 | Yoshino et al. | ......... 347/250 X |
| RE36,841 E | * | 8/2000 | Arimoto et al. | ............ 347/250 |

FOREIGN PATENT DOCUMENTS

| JP | 58-49963 | * | 3/1983 |
| JP | 62-243467 | * | 10/1987 |
| JP | 2-282763 | * | 11/1990 |
| JP | 4-355776 | * | 12/1992 |
| JP | 6-57040 | | 7/1994 |
| JP | 6-227037 | | 8/1994 |

* cited by examiner

Primary Examiner—Susan S. Y. Lee
(74) Attorney, Agent, or Firm—Fitzpatrick, Cella, Harper & Scinto

(57) ABSTRACT

An image forming apparatus, includes an image forming unit including an image bearing member, a beam generating unit for generating a plurality of light beams and an optical scan system for scanning the image bearing member with the plurality of light beams to write an image, a beam detecting unit for detecting the plurality of light beams scanning the image bearing member at predetermined positions and obtaining a plurality of beam detection signals, a clock generating unit for generating a single clock signal, a controller for controlling the frequency of the single clock signal and a synchronization circuit for controlling the phase of the single clock signal in accordance with the plurality of beam detection signals obtained by the beam detecting unit, and generating a plurality of control clocks, wherein the plurality of beams are generated in accordance with the plurality of control clocks.

32 Claims, 8 Drawing Sheets

| M | N | VIDEO CLOCK FREQUENCY VARIABLE STEP UP (ppm) |
|---|---|---|
| 997 | 1027 | |
| 1098 | 1131 | 34.6 |
| 1066 | 1098 | 34.8 |
| 1134 | 1168 | 35.3 |
| 935 | 963 | 34.8 |
| 1003 | 1033 | 35.2 |

IMAGE FORMING APPARATUS

BACKGROUND OF THE INVENTION

1. Field of the Invention

The present invention relates to an image forming apparatus, and more particularly to an apparatus for forming an image by using a plurality of light beams.

2. Related Background Art

Of such apparatus, a color image forming apparatus of a recent electronic photograph type has a plurality of image forming units in order to speed up the image forming operation. Various methods have been proposed for sequentially transferring different color images to a recording medium held on a transport belt.

An apparatus having a plurality of image forming units has the following problems. Because of mechanical precision and the like, a change in motion of a plurality of photosensitive drums and a transport belt, a change in motion relation between a circumferential surface of each photosensitive drum and the transport belt at a transfer position of each image forming unit, and the like occur differently at each color. Therefore, when images of different colors are superposed, color aberration (position misalignment) occurs.

There is an error of an optical distance between a laser scanner and a photosensitive member of each image forming unit. If this error of each image forming unit is different, there is a difference of a main scan magnification of a beam on the photosensitive drum so that the color aberration (position misalignment) occurs. If there is a position displacement of a laser scanner and a photosensitive member of each image forming unit relative to the beam scan direction (hereinafter called a main scan direction) and this position displacement is different at each image forming unit, color aberration (position misalignment) appears on the final images.

In order to reduce the color aberration (position misalignment) to be caused by a difference of the main scan magnification, a method of correcting the main scan magnification has been proposed (e.g., JP-B-06-57040) in which as shown in FIG. 1, a video clock generator for video signals is provided for each color, and the frequency of the video clock for each color is independently changed and adjusted to correct the main scan magnification.

With reference to FIG. 1, a conventional method of changing a video clock frequency of an image forming apparatus will be described.

FIG. 1 is a block diagram showing the structure of a PLL (phase locked loop) for changing the frequency of a video clock signal of a conventional image forming apparatus described in JP-B-06-57040.

In FIG. 1, a crystal oscillator 1007 generates a clock signal 14 at a frequency fin. A 1/M frequency divider 1002 divides the frequency of a clock signal 14 output from the crystal oscillator 1007 by M. A 1/N frequency divider 1006 divides the frequency of a clock signal (video clock) 15 output from a voltage controlled oscillator 1005 by N. A phase comparator 1003 compares the phase of the clock signal 14 output from the crystal oscillator 1007 and divided by M with the phase of the video clock 15 output from the voltage controlled oscillator 1005 and divided by N.

A low-pass filter 1004 receives a comparison result from the phase comparator 1003 and changes an input voltage of the voltage controlled oscillator 1005. For example, if the phase of the clock signal 14 output from the crystal oscillator 1007 and divided by M advances from the phase of the video clock 15 output from the voltage controlled oscillator 1005 and divided by N, the input voltage to the voltage controlled oscillator 1005 is raised to advance the phase of the video clock 15.

The PLL 1008 has the 1/M frequency divider 1002, phase comparator 1003, low-pass filter 1004, voltage controlled oscillator 1005 and 1/N frequency divider 1006.

The operation of PLL will be described more specifically.

The clock signal 14 output from the crystal oscillator 1007 and divided by M and the video clock signal 15 divided by N are input to the phase comparator 1003. An output of the phase comparator 1003 is passed through the low-pass filter 1004 which supplies a voltage to the voltage controlled oscillator 1005. For example, if the phase of the clock signal 14 output from the crystal oscillator 1007 and divided by M advances from the phase of he video clock 15 divided by N, the input voltage to the voltage controlled oscillator 1005 is raised to advance the phase of the video clock 15.

If the frequency of the clock signal 14 output from the crystal oscillator 1007 is represented by fin, and that of the video signal 15 is represented by fout, then the following equation is satisfied:

$$fout = fin \times N/M$$

The values of N and M are adjusted in accordance with a detected main scan width to thereby adjust the video clock frequency and correct the main scan width.

In order to speed up an image forming operation, a plurality of lines are scanned at the same time by using a plurality of beams.

A scanner optical system capable of scanning a photosensitive drum with a plurality of beams, particularly with two beams, will be described briefly.

FIG. 2 is a perspective view showing the outline structure of a scanner optical system capable of scanning a photosensitive drum with a plurality of beams, particularly with two beams.

In FIG. 2, laser sources (semiconductor laser) 81 (81a, 81b) emit a plurality of laser beams (hereinafter simply called beams) 87a and 87b. A collimator lens 82 collimates the plurality of beams 87a and 87b output from the laser source 81. A polygon mirror 83 scans a plurality of beams 87a and 87b collimated by the collimator lens 82. An fθ lens 84 adjusts the scan speeds of the plurality of beams 87a and 87b scanned by the polygon mirror 83. The plurality of beams 87a and 87b scanned via the fθ lens form latent images corresponding to the video signals on the surface of a photosensitive drum 1. A position detection sensor (hereinafter called a BD sensor) 86 detects the plurality of scanned beams 87a and 87b and outputs horizontal synchronization signals (BD signals (BD(A), BD(B)).

The operation of the scanner optical system will be described more specifically.

The plurality of beams 87a and 87b emitted from the laser source 81 (81a, 81b) are collimated by the collimator lens 82 and thereafter scanned by the polygon mirror 83. The scan speeds of the plurality of scanned beams 87a and 87b are adjusted by the fθ lens 84. Latent images corresponding to video signals are eventually formed on the photosensitive drum 1.

Scanning the photosensitive drum 1 with the plurality of beams as shown in FIG. 2 is associated with some problem. Because of a difference of an emission light wavelength between semiconductor lasers (in FIG. 2, semiconductor lasers 81a and 81b) of the laser sources, the main scan magnification for each beam becomes different (JP-A-06-227037). To solve this problem, a method of adjusting the main scan magnification for each beam by changing the video clock frequency for each beam has been proposed (JP-A-06-227037).

FIG. 3 is a block diagram showing the structure of video clock frequency variable unit of an image forming apparatus described in JP-A-06-227037. In FIG. 3, like elements to those shown in FIG. 2 are represented by using identical reference symbols.

In FIG. 3, crystal oscillators 91a and 91b output clock signals whose frequencies were adjusted so that each beam 87a, 87b has the same main scan magnification. Horizontal synchronization units (BD synchronization units) 92a and 92b synchronize the clock signals output from the first and second crystal oscillators 91a and 91b with BD signals 95 output from the BD sensors 86.

Laser drive units (LDA driver unit, LDB driver unit) 93a and 93b drive the semiconductor lasers (LDA 81a, LDB 81b) in accordance with video signals. As shown in FIG. 2, a single laser scanner optical system has two semiconductor lasers (LDA 81a, LDB 81b), and the main scan magnification for each laser beam can be adjusted independently.

The operation of the video clock frequency variable unit will be described specifically.

The first and second crystal oscillators 91a and 91b output clock signals whose frequencies were adjusted so that each beam 87a, 87b has the same main scan magnification. The clock signals output from the first and second crystal oscillators 91a and 91b are input to the horizontal synchronization units (BD synchronization units) 92a and 92b which supply the video clock signals synchronized with the BD signals 95 output from the BD sensors 86 to the laser drive units (LDA drive unit 93a, LDB drive unit 93b). The laser drive units (LDA drive unit 93a, LDB drive unit 93b) drive the semiconductor lasers (LDA 81a, LDB 81b) in accordance with video signals.

The main scan magnification correction of one color, e.g., black (k). has been described above. As shown in FIG. 3, similar units for other three colors (cyan (c), magenta (m) and yellow (y)) are also provided, totalling in four color units.

This configuration is, however, associated with the following problems. The image forming unit of each color including black (b), cyan (c), magenta (m) and yellow (y) has a plurality of laser sources (semiconductor lasers (LDA 81a, LDB 81b). It is therefore necessary to provide a number of crystal oscillators. In the example shown in FIG. 3, two crystal oscillators 91a and 91b are provided for each color, totalling in eight crystal oscillators for four colors. For example, if each of four image forming units scans four beams, sixteen crystal oscillators are necessary.

As described in JP-A-06-227037, if the common video clock signal is used for a plurality of semiconductor lasers, a refraction angle of the lens may become different for each laser beam because of a different wavelength of each laser beam generated by the semiconductor laser. Therefore, the main scan magnification for each laser beam becomes different and the formed image has a low precision.

For example, JP-B-06-57040 describes that if the video clock is to be changed by 0.1%, the counter for a frequency divider requires 10 bits, and that the minimum variable frequency of a video clock signal is determined by a frequency division ratio. Namely, N/M=1000/1000 is changed to N/M=999/1000 to obtain a variable step of −0.1%.

According this teaching, if the video clock is to be changed by 0.001%, the frequency division ratio is set to about 100000. For example, in the case of "main scan width of reference color=300000 μm (300 nm)", "main scan width of adjustment color=300003 μm" and "N/M of adjustment color=1", then the N/M of adjustment color is set to "N/M= 0.99999 (corresponding to −0.001%), e.g., N=99999 and M=100000".

In the case of "main scan width of reference color= 300000 μm (300 nm)", "main scan width of adjustment color=299997 μm" and "N/M of adjustment color=1", then the N/M of adjustment color is set to "N/M=1.00001 (corresponding to +0.001%), e.g., N=100001 and M=100000".

However, as N is made lager, the loop feedback amount of PLL becomes smaller. As in the examples described above, if N is nearly equal to 100000 and fout is nearly equal to 20 MHz, the feedback to the phase compartor 1003 is executed once per about 5 msec.

If jitter of VCO 1005 is large, jitter becomes conspicuous during the period while the feedback is not executed.

Since the feedback to the phase compartor 1003 is executed once per 5 msec, the jitter of the video clock signal 15 is improved only every 5 msec. While the jitter is not improved, the jitter of VCO 1005 itself appears. The jitter of a PLL circuit can be reduced to about the same degree of a reference clock. However, if N is set to about 100000, the feedback amount becomes small so that the jitter becomes large as compared to that of the reference clock.

As above, the conventional image forming apparatus has the following disadvantages.

If the main scan magnification variable step is made small in order to improve the correction precision of a main scan magnification, it is necessary to set larger the values of M and N of the frequency dividers 1002 and 1006 shown in FIG. 1. As the value of N is made large, the feedback amount of PLL becomes small so that the jitter of VCO 105 directly appears on the video click signal 15. The jitter of the video clock signal 15 results in the position misalignment or color aberration of the final image.

In order to reduce the jitter on the video click signal 15, a VCO having a small jitter may be used with a PLL circuit. However, in this case, the cost of the apparatus rises.

SUMMARY OF THE INVENTION

It is an object of the invention to solve the above-described problems.

It is another object of the present invention to form an image of high precision by correcting a difference of a scan magnification caused by a difference of a wavelength of each of a plurality of light beams with which the image is formed.

It is another object of the invention to form an image of high precision inexpensively and at high speed.

Under the above objects of the invention, according to one aspect of the present invention, there is provided an image forming apparatus comprising: an image forming unit including an image bearing member, beam generating means for generating a plurality of light beams and an optical scan system for scanning the image bearing member with the plurality of light beams generated by the beam generating means to write an image; beam detecting means for detecting the plurality of light beams scanning the image bearing member at predetermined positions and obtaining a plurality of beam detection signals; clock generating means for generating a single clock signal; control means for controlling the frequency of the single clock signal by controlling the clock generating means; and synchronization means for controlling the phase of the single clock signal generated by the clock generating means in accordance with the plurality of beam detection signals obtained by the beam detecting means, and generating a plurality of control clocks, wherein the generating means generates the plurality of beams in accordance with the plurality of control clocks.

The other objects and features of the invention will become apparent from the following detailed description of embodiments when read in conjunction with the accompanying drawings.

DETAILED DESCRIPTION OF THE PREFERRED EMBODIMENTS

The structure of a video clock generator unit capable of changing the frequencies of video clock signals for all colors according to a first embodiment will be described.

Figure 4:
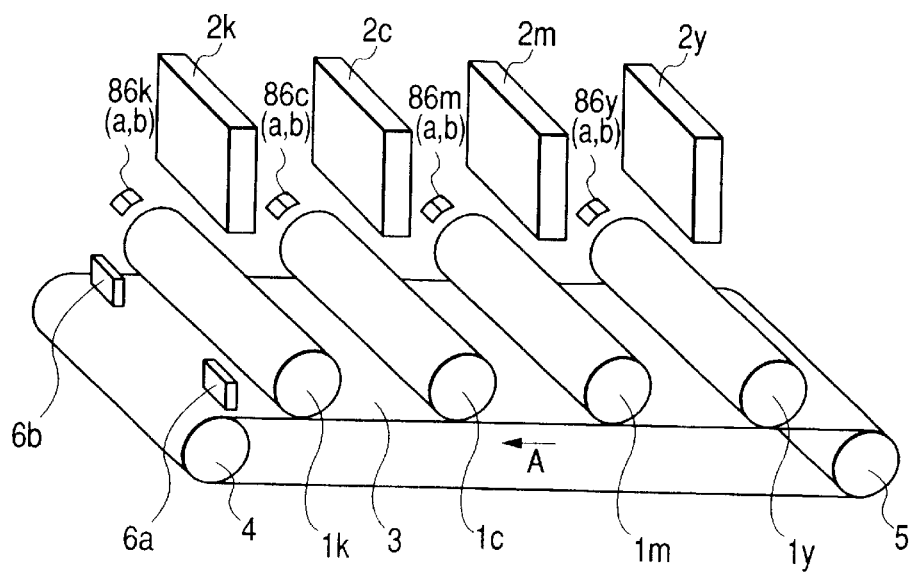
FIG. 4 is a diagram showing an image forming apparatus according to an embodiment of the invention.

FIG. 4 is a perspective view showing the outline structure of an image forming apparatus according to the first embodiment of the invention.

In this embodiment of the invention, a color image forming apparatus with image forming units for four colors including yellow (y), magenta (m), cyan (c) and black (b) will be described. The present invention may be also applicable to an image forming apparatus with image forming units for three colors or more or five colors or more.

In FIG. 4, photosensitive drums 1k, 1c, 1m and 1y for four colors, black k, cyan c, magenta m and yellow y form electrostatic latent images. Laser scanner optical systems 2k, 2c, 2m and 2y for four colors, black k, cyan c, magenta m and yellow y each have a semiconductor laser array (shown in FIG. 7 to be later described) as laser sources, and expose the photosensitive drums 1k, 1c, 1m and 1y in accordance with video signals to form latent images on the drums. An endless transport belt 3 moves in the direction indicated by an arrow A to transport a sheet as a recording medium sequentially to image forming units for respective colors (the unit constituted of a photosensitive drum 1, laser scanner optical system 2 and the like). The transport belt 3 functions also as a transfer belt for transferring a toner image formed with an unrepresented developer of each color above the photosensitive drums 1k, 1c, 1m and 1y.

A driving roller 4 is coupled to an unrepresented driving unit such as a motor and gears and drives the transport belt 3. A driven roller 5 rotates following the drive operation of the driving roller 4 and provides the transport belt 3 with a constant tension. A pair of sensors 6 (6a, 6b) is mounted on both sides of the transport belt and detects position displacement detection patterns formed on the transport belt 3. Position detection sensors (hereinafter called BD sensors) 86k (86ka, 86kb), 86c (86ca, 86cb), 86m (86ma, 86mb) and 86y (86ya, 86yb) of k, c, m and y colors detect two laser beams scanned by each of the laser scanner optical systems 2k, 2c, 2m and 2y of respective colors and output horizontal synchronization pulse signals (hereinafter called BD signals (BD(A) signal, BD(B) signal) of respective colors.

The operation of the image forming apparatus will be described more specifically.

Data to be printed is supplied from an information processing apparatus (not shown) such as a personal computer (PC) to the image forming apparatus. When an image forming state of a printer engine is established, a sheet as a recording medium is supplied from an unrepresented sheet cassette to the transport belt 3 and transported by the transport belt 3 sequentially to the image forming units of respective colors.

Synchronously with the sheet transport timings of the transport belt 3, the video signal of each color is supplied to each laser scanner optical system 2k, 2c, 2m and 2y to form electrostatic latent images of k, c, m and y colors on the photosensitive drums 1k, 1c, 1m and 1y. The latent images are developed by developers (not shown) by using toners of respective colors k, c, m and y. The developed toner images are transferred and superposed upon the sheet by the transport belt 3 functioning also as the transfer belt (in the example shown in FIG. 4, images of y, m, c and k are sequentially formed in this order). Thereafter, the sheet is separated from the transport belt 3, and the toner images are fixed to the sheet by heat of a fixing unit (not shown), and thereafter the sheet is ejected out.

Figure 1:
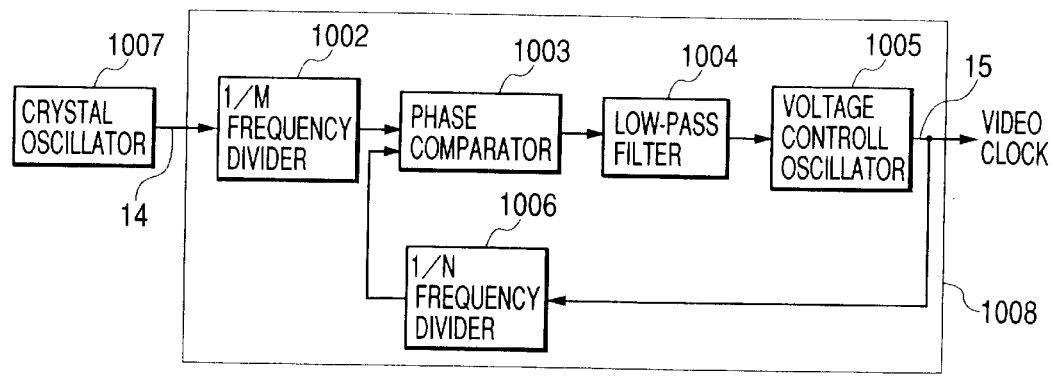
FIG. 1 is a diagram showing the structure of a PLL circuit.
Figure 2:
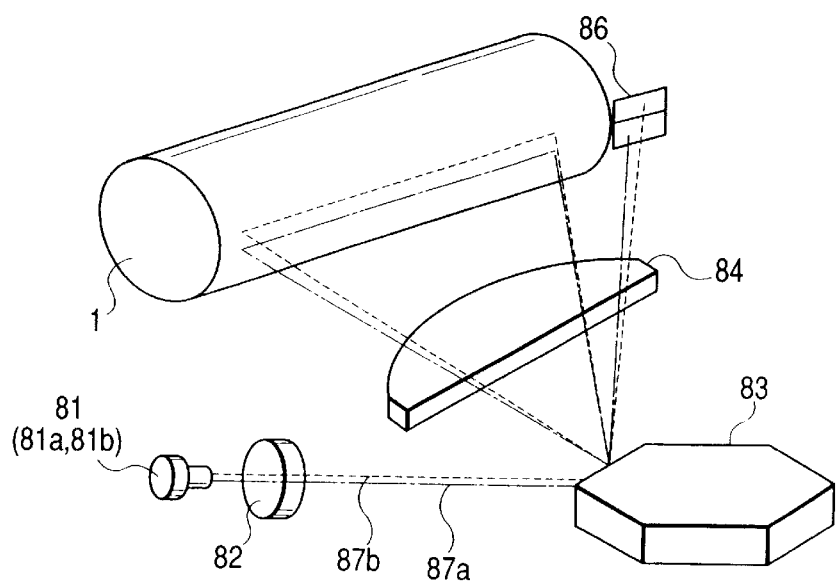
FIG. 2 is a diagram showing the structure of an optical scan system.
Figure 3:
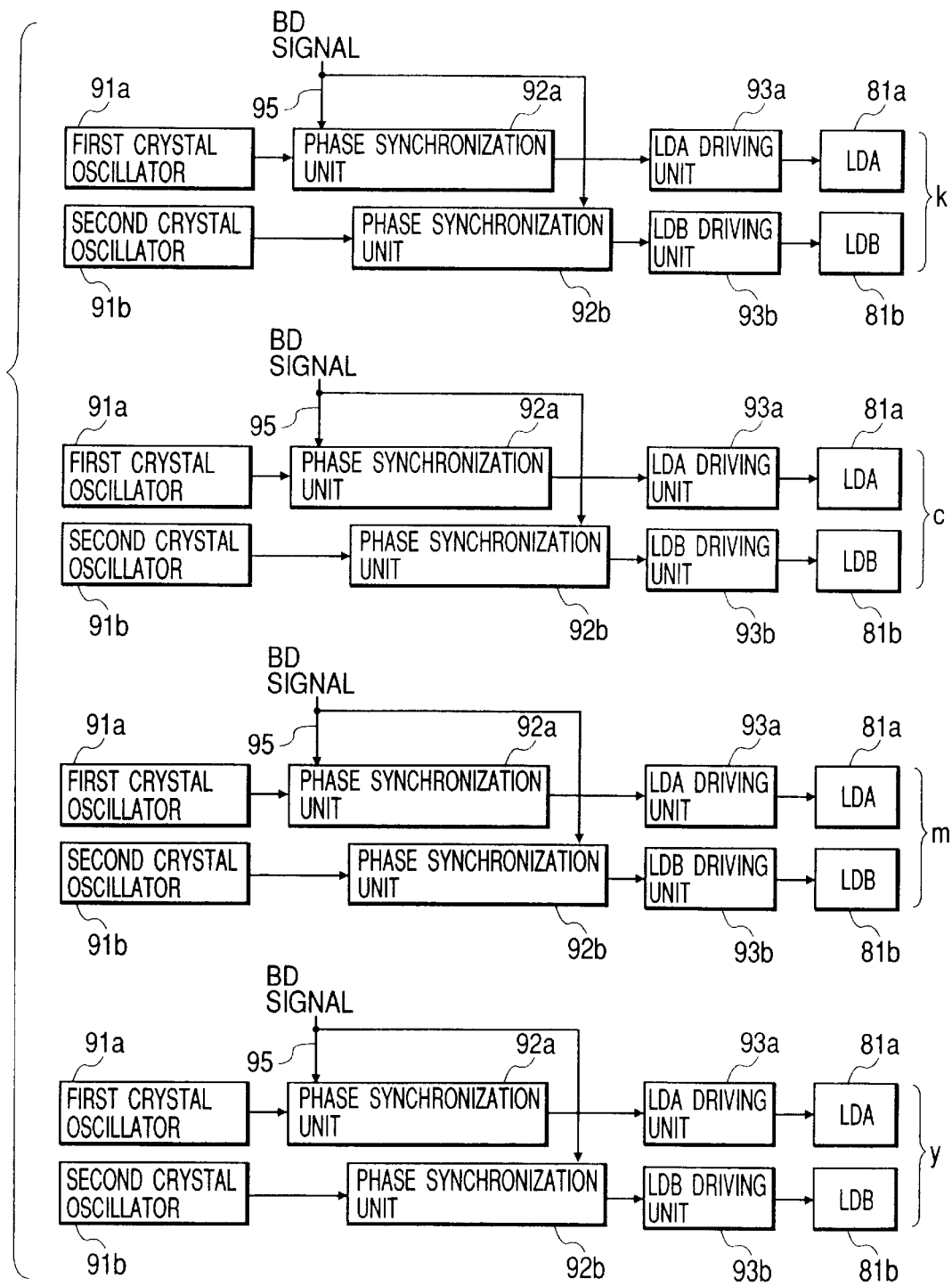
FIG. 3 is a diagram showing the structure of a conventional video clock generator circuit.

It is assumed that the laser scanner optical systems 2k, 2c, 2m and 2y of the image forming units have the similar structure as the optical scanner system shown in FIG. 2 and that the BD signal is detected at the right end of the image. In this embodiment, however, the position detection sensor 86 has two sensors 86a and 86b to independently detect the two light beams for each color and output the BD(A) signal and BD(B) signal.

Since there are a plurality of image forming units, a position displacement of each image forming unit relative to the main scan direction may occur. If the position displacement is different for each color, the position misalignment (color aberration) in the main scan direction occurs.

Figure 5:
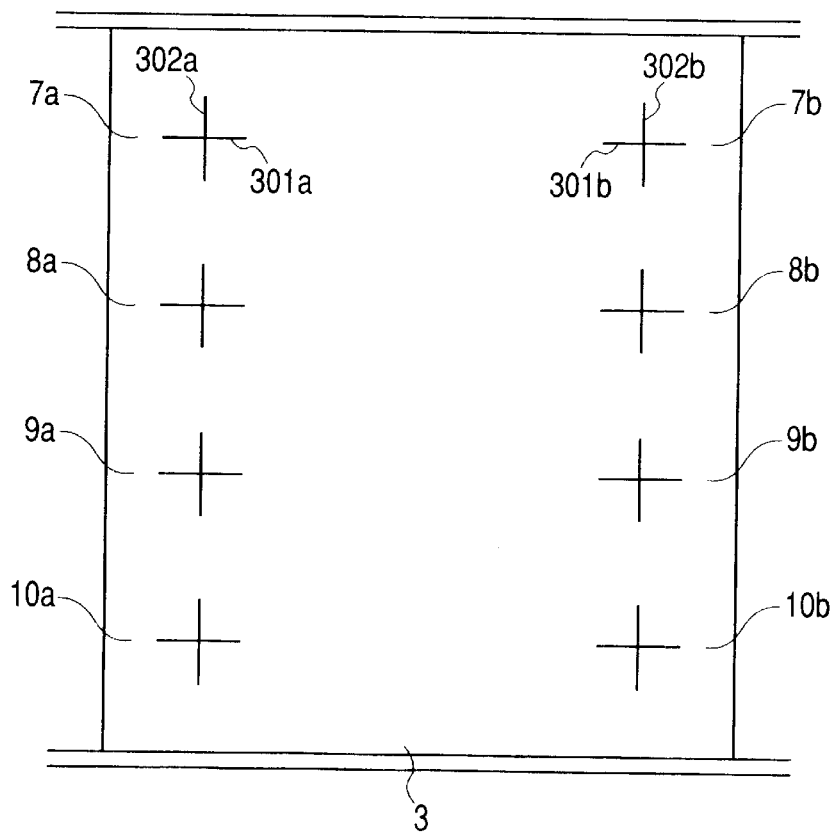
FIG. 5 is a diagram showing registration marks used with the apparatus shown in FIG. 4.

In order to reduce this position misalignment (color aberration), the position displacement detection patterns such as shown in FIG. 5 to be described later are formed on the transport belt 3. Theses patterns are read with the sensor pair 6 (6a, 6b) mounted on both sides of the transport belt 3 to thereby detect the position displacement amount of each color.

Figure 6:
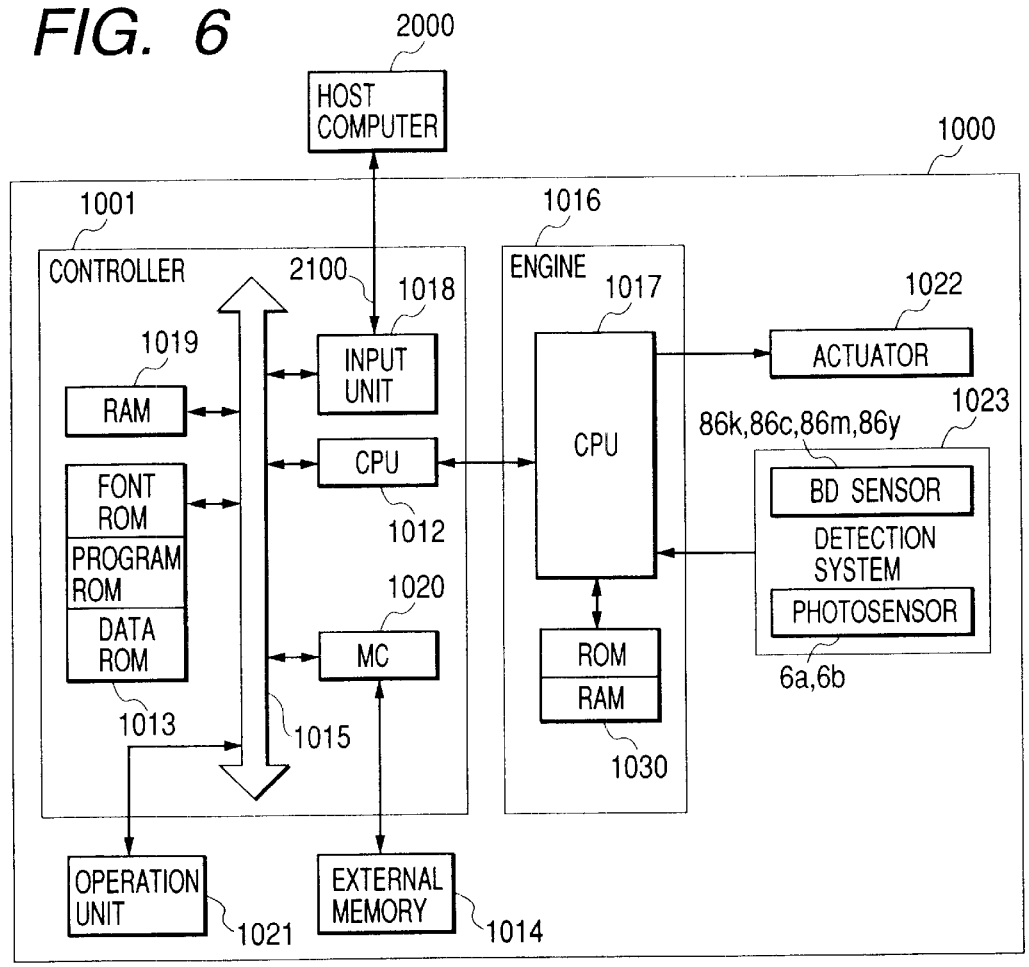
FIG. 6 is a diagram showing the main structure of the apparatus shown in FIG. 4.

FIG. 6 is block diagram showing the structure of the image forming apparatus according to the first embodiment of the invention. In FIG. 6, like elements to those shown in FIG. 4 are represented by using identical reference numerals.

In this image forming apparatus 1000, a CPU 1012 of a controller 1001 collectively controls accesses to various devices connected to a system bus 1015, in accordance with control programs or the like stored in a program ROM in a ROM 1013 or in accordance with control programs or the like stored in an external memory 1014 such as a hard disk, a floppy disk and a magnetooptical disk. CPU 1012 outputs and supplies video signals to a printer engine 1016. A font ROM in ROM 1013 stores font data and the like to be used when the video signal is generated. A data ROM in ROM 1013 stores data to be used by a host computer 2000 for a printer not provided with an external memory 1014 such as a hard disk.

CPU 1012 can perform bidirectional communications with the host computer via an interface 2100, and can notify data in the image forming apparatus to the host computer 2000. A RAM 1019 is used as the main memory, work area and the like of CPU 1012. The memory capacity can be expanded by an optional RAM connected to an expansion port (not shown). CPU 1012 in the controller 1001 and CPU 1017 in the printer engine 1016 have each an internal timer to count time.

RAM 1019 is used as a video signal development area, an environment data storage area, a non-volatile RAM and the like. An access to the external memory 1014 such as a hard disk (HD) and an IC card is controlled by a memory controller (MC) 1020. The external memory 1014 is optionally provided and stores font data, an emulation program, form data and the like. An operation unit 1021 has switches, LED display units, LCD display units and the like for various operations and settings.

The external memory 1014 is not limited only to one, but two or more memories are used. A plurality of external memories which store internal font data and programs for interpreting printer control languages of different language systems and programs for option cards, can be connected to the external memory 1014. A non-volatile memory (not shown) such as NVRAM may be provided to store various setting data entered from the operation unit 1021.

The printer engine 1016 has a CPU 1017 and a ROM/RAM 1030. CPU 1017 operates an actuator 1022 at a predetermined timing in order to print video signals supplied from CPU 1012 of the controller 1001, and controls the operation of the actuator 1022 by feeding back signals supplied from various detection systems 1023 (photo sensors 6a and 6b; BD sensors 86k (86ka, 86kb), 86c (86ca, 86cb), 86m (86ma, 86mb), 86y (86ya, 86yb) of respective colors k c, m and y; door sensor (not shown) and the like). The ROM/RAM 1030 stores the control program to be executed by CPU 1017, pattern image data for generating the position displacement detection patterns shown in FIG. 5 to be later described, write timing data (correction data) of respective laser scanner optical systems 2k, 2c, 2m and 2y, and data read from the detection systems 1020 (including photo sensors 6a, 6b).

In accordance with pattern image data stored in the non-volatile memory such as NVRAM in ROM/RAM 1030, CPU 1017 controls the components of the engine 1016 such as the laser scanner optical systems 2k, 2c, 2m and 2y so as to form the position displacement detection patterns shown in FIG. 5 on the transport belt 3.

CPU 1017 controls the start of writing video signals, by synchronizing each BD signal output from the BD sensor 86k (86ka, 86kb), 86c (86ca, 86cb), 86m (86ma, 86mb) and 86y (86ya, 86yb) with the video clock signal or by delaying each color BD signal from the video clock. CPU 1017 corrects for each color a delay time from the output of each color BD signal to the start of writing video signals, to thereby control the write position of each color.

In order to correct the time from the output of each color BD signal to the start of writing video signals, CPU 1017 calculates correction data for the write position (correction data for correcting the time from the output of each color BD signal to the start of writing video signals), in accordance with the result of detection of the position displacement detection patterns by the photo sensors 6a and 6b, and stores the correction data in a non-volatile memory such as NVRAM in ROM/RAM 1030.

Upon instruction of an image forming process, CPU 1017 corrects for each color the delay time from the output of each color BD signal to the start of writing video signals in accordance with the each color correction data of y, m, c and k stored in ROM/RAM, to thereby control the write position of each color.

In accordance with the result of detection of the position displacement detection patterns by the photo sensors 6a and 6b, CPU 1017 calculates a video clock frequency corresponding to each color semiconductor laser to correct the scan magnification of each color, and stores the calculation result in the non-volatile memory such as NVRAM in ROM/RAM 1030.

Upon instruction of an image forming process, CPU 1017 controls a PLL 51 shown in FIG. 9 to be described later to output the video clock signal to be output to each color semiconductor laser and having the video clock frequency stored in ROM/RAM 1030, to thereby control the scan magnification of each color.

FIG. 5 is a schematic diagram showing an example of the position displacement detection patterns used by the image forming apparatus of the invention.

In FIG. 5, each of cross patterns 7 (7a, 7b), 8 (8a, 8b), 9 (9a, 9b), 10 (10a, 10b) of respective colors k, c, m and y is constituted of a straight line pattern 301 (301a, 301b) extending in the main scan direction (laser scan direction) and a straight line pattern 302 (302a, 302b) extending in the transport direction. The cross patterns 7a, 8a, 9a and 10a are formed on the front side of the transport belt 3 as viewed in FIG. 4, and the cross patterns 7b, 8b, 9b and 10b are formed on the rear side of the transport belt 3 as viewed in FIG. 4.

The cross patterns 7a, 8a, 9a and 10a are detected (read) with the photo sensor 6a, whereas the cross patterns 7b, 8b, 9b and 10b are detected (read) with the photo sensor 6b. CPU 1017 calculates (detects) the position displacement amount in the transport direction from the detection positions of the straight line patterns 301a and 301b extending in the laser scan direction, and calculates (detects) the position displacement amount (right and left ends of the scan line) in the laser scan direction from the detection positions of the straight line patterns 302a and 302b extending in the transport direction.

CPU 1017 calculates the main scan magnification of each color from the distance between the straight lines 302a and 302b extending in the transport direction.

Next, with reference to FIG. 7, the semiconductor laser array as laser sources provided in each of the laser scanner optical systems 2k, 2c, 2m and 2y shown in FIG. 4 will be described.

Figure 7:
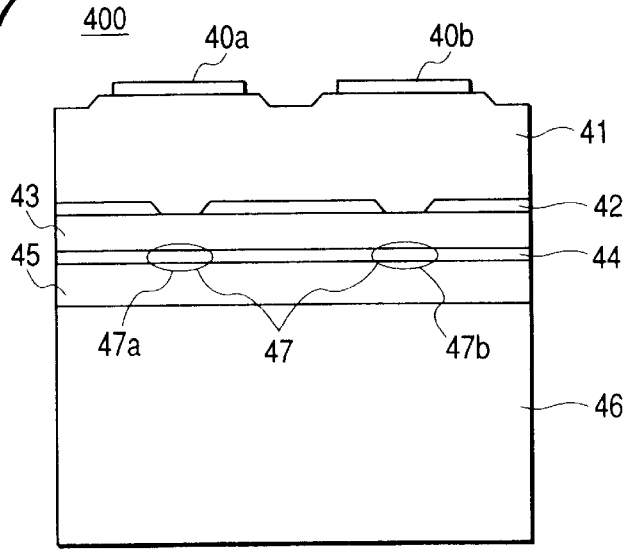
FIG. 7 is a diagram showing a semiconductor laser array used with the apparatus shown in FIG. 4.

FIG. 7 is a cross sectional view showing the outline structure of an end facet emission type semiconductor laser array provided in each of the laser scanner optical systems 2k, 2c, 2m and 2y shown in FIG. 4. The scaling of FIG. 7 is made greatly different in each area in order to make the description easy to be understood.

In FIG. 7, a semiconductor laser array 400 has two light emission regions 47 (47a, 47b) in a single laser chip. The laser chip has electrodes 40a and 40b, a contact layer 41, a block layer 42; a first clad layer 43, an active layer 44, a second clad layer 45 and a substrate 46. A distance between the two light emission regions 47a and 47b is several tens $\mu$m.

The oscillation wavelength of a semiconductor laser is mainly determined from the composition and thickness of regions around emission points in the active layer. Therefore, if a plurality of semiconductor lasers are formed in a single laser chip, the distance between light emission regions can be made short. Therefore, the factors of determining the oscillation wavelength, such as the composition and thickness of regions around emission points in the active layer, can be made generally the same for a plurality of semiconductor lasers. Laser beams having the same wavelength can therefore be obtained.

As described earlier, the reason that the main scan magnification of a beam passing through the same optical system becomes different, greatly depends upon a difference of the wavelength of each beam. By forming a plurality of semiconductor lasers on a single laser chip, the wavelength of each beam can be made substantially the same. The main scan magnification of each beam passing through the same optical system can therefore be made equal.

Next, the details of the laser scanner optical system of this embodiment will be described.

Figure 8:
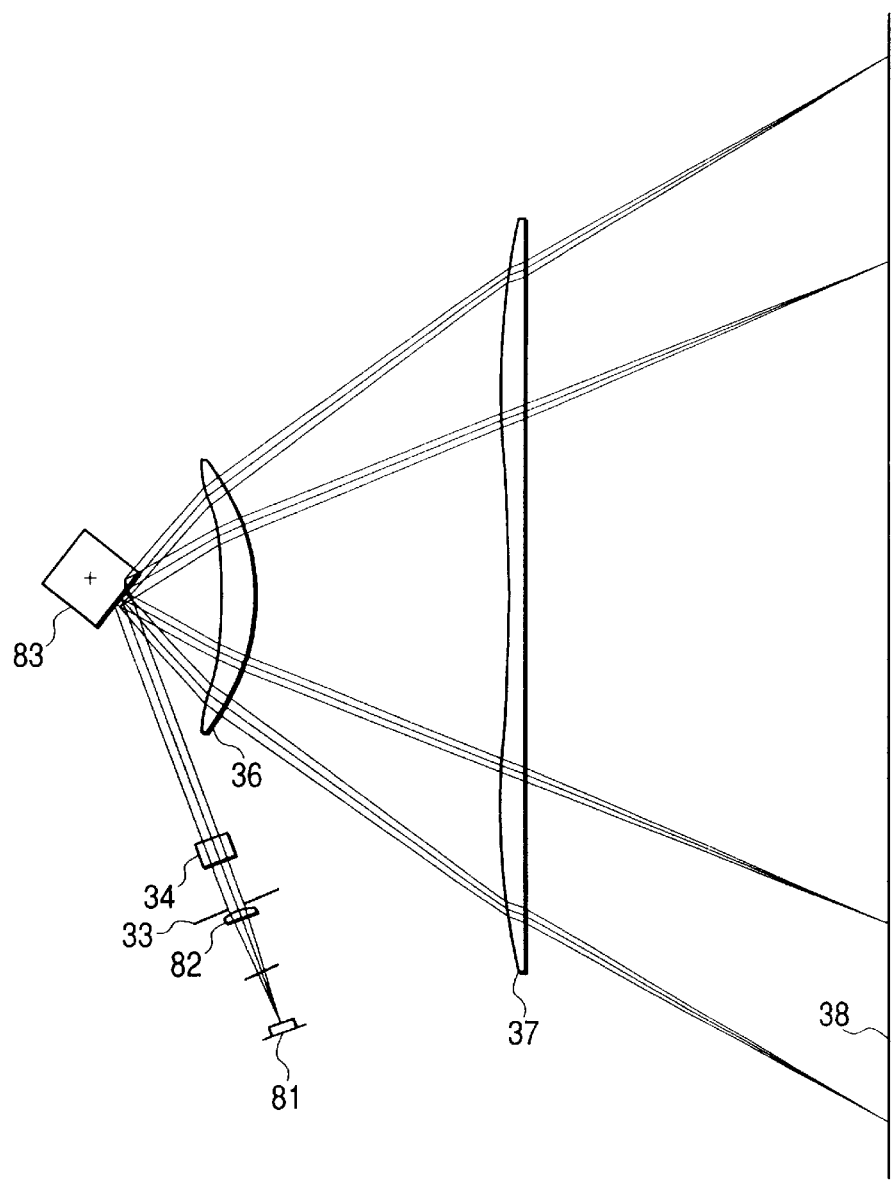
FIG. 8 is a diagram showing the main structure of an optical scan system of the apparatus shown in FIG. 4.

FIG. 8 is a cross sectional view taken along the main scan direction and showing the main portion of the laser scanner optical system of this embodiment. In FIG. 8, only a single beam is shown. A plurality of beams are emitted from the laser source 81, pass through very narrow areas in the optical system, and scan a scanning surface 38. In FIG. 8, like elements to those shown in FIG. 2 are represented by using identical reference numerals. In FIG. 8, a refraction element (lens) and a diffraction element are used by way of example. A beam emitted from the laser source 81 is converted into generally parallel light by the collimator lens 82. The light amount of this beam is limited by the diaphragm 33 and becomes incident upon a cylinder lens 34. The beam reflected by the polygon mirror 83 becomes incident upon an optical system made of the refraction element and diffraction element. In this embodiment, as shown in FIG. 8, a toric lens 36 is disposed on the polygon mirror side and a composite optical element 37 is disposed on the scanning surface side. Although not shown, the fθ lens shown in FIG. 2 is disposed between the polygon mirror 83 and toric lens 36. The composite optical element 37 has on its input side an aspheric surface (flat in the sub-scan direction) having power only in the main scan direction, and on its output side a flat surface having a diffraction grating. The shape of the diffraction grating is preferably a Fresnel's diffraction grating of a saw tooth shape formed by cutting the surface thereof, a stepwise diffraction grating formed by photo etching, or the like. The beam output from the composite optical element 37 is focussed upon and scanned on the scanning surface (photosensitive member) 38. In this embodiment, the power arrangement of the toric lens 36 and composite optical element 37 is determined so as to compensate for a change in the focus position in the main scan direction caused by a difference or change in the beam wavelength. Namely, the magnification color aberration of the scan optical system is compensated (magnification color compensation) by the refraction element having a positive dispersion in the main scan direction and the diffraction element having a negative dispersion. The configuration of the laser scan optical system described above can suppress a change in the main scan direction magnification caused by the difference or change in the beam wavelength and can make substantially equal the main scan magnification of each beam in the same optical system. It is therefore possible to use the common video clock signal for each beam in the same optical system. The optical path can be shortened through high view angle aberration compensation using the aspheric surface.

Figure 9:
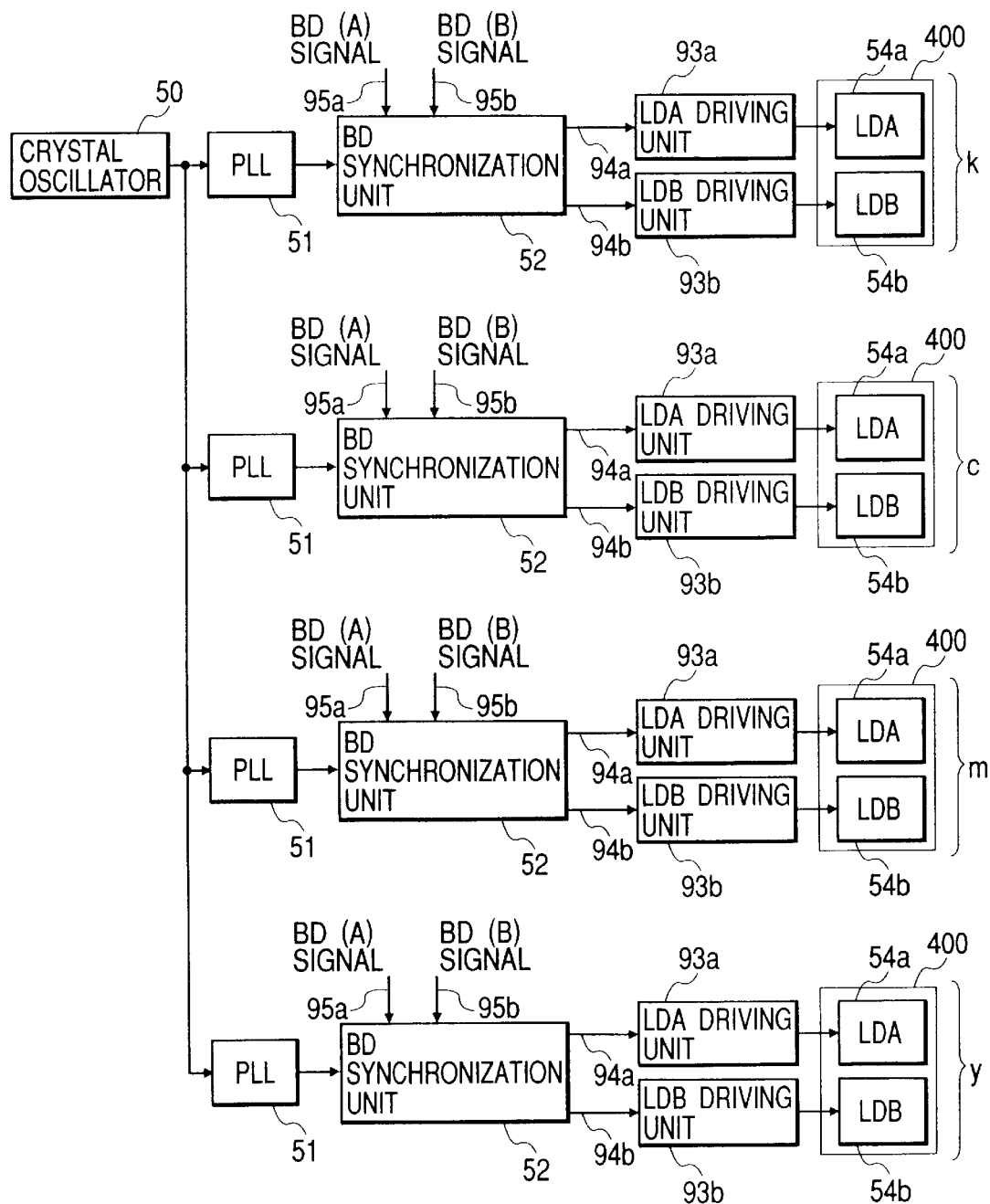
FIG. 9 is a diagram showing the main structure of a printer engine shown in FIG. 6.

FIG. 9 is a block diagram showing the structure of the printer engine 1016 shown in FIG. 6. In FIG. 9, like elements to those shown in other drawings are represented by identical reference numerals.

Referring to FIG. 9, semiconductor lasers (LD) 54a and 54b are formed on a single laser chip and have the structure same as that of the semiconductor laser array 400 shown in FIG. 7. Therefore, the laser beams emitted from the semiconductor lasers 54a and 54b correspond to the laser beams emitted from the light emission regions 47a and 47b of the semiconductor laser array 400 shown in FIG. 7. The semiconductor lasers 54a and 54b are contained in a single optical system similar to the laser source 81 shown in FIG. 2. The common video clock signal is used for the two semiconductor lasers 54a and 54b. A crystal oscillator 50 generates a main clock signal of a high frequency. A PLL 51 controls a frequency division ratio upon instruction by CPU 1017, as will be described later.

A horizontal synchronization unit (BD synchronization unit) 52 synchronizes the clock signal output from PLL 51 with the BD signals (BD(A) signal 95a, BD(B) signal 95b) output from the BD sensors 86a and 86b, and supplies the clock signals to the laser drive unit (LDA drive unit 93a, LDB drive unit 93b).

As will be later described, PLL 51 changes the internal frequency division ratio (N/M) under the control of CPU 1017, and outputs the video clock signal having a frequency which provides the same main scan magnification for all colors. If the position of the scan line in the main scan direction is to be changed, for example, in the unit of "1/L" dot (L is a positive integer), PLL 51 outputs a video clock signal having a frequency multiplied by L.

The BD synchronization unit 52 is made of an IC and synchronizes the video clock signal with the horizontal synchronization signal (BD signal) at a precision of "1/L" dot. In the inside of the IC, the clock signal (video clock) generated by the crystal oscillator 50 and multiplied by L by PLL 51 is frequency-divided by L, so as to synchronize with the BD signals output from the BD sensors 86a and 86b, to thereby obtain clock signals 94a and 94b.

Since the clock signals 94a and 94b output from the BD synchronization unit 52 are synchronized with different BD signals 95a and 95b, although the clock frequencies are the same, the phase may become different.

The crystal oscillator 50 and PLL 51 constitute the video clock generator unit of respective laser scanner optical systems 2k, 2c, 2m and 2y.

Next, the operation of PLL 51 of each color will be detailed.

Figures 10, 11:
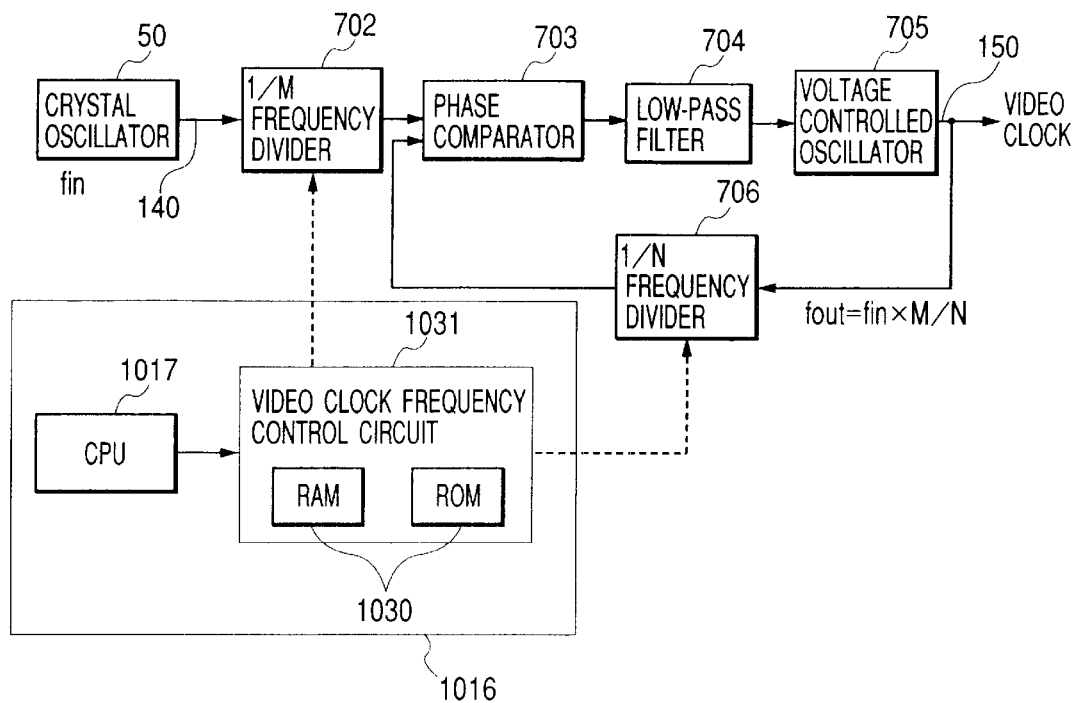
FIG. 10 is a diagram showing the structure of a PLL circuit shown in FIG. 9.
FIG. 11 is a diagram showing control data for the PLL circuit shown in FIG. 9.

FIG. 10 is a block diagram showing the structure of PLL 51 of each color shown in FIG. 9. In FIG. 9, like elements to those shown in FIG. 5 are represented by using identical reference numerals.

In FIG. 10, reference numeral 702 represents a 1/M frequency divider, reference numeral 703 represents a phase comparator, reference numeral 704 represents a low-pass filter, reference numeral 705 represents a voltage controlled oscillator, reference numeral 706 represents a 1/N frequency divider, reference numeral 140 represents an output signal from the crystal oscillator 50, and reference numeral 150 represents a variable video clock signal.

Reference numeral 700 represents a video clock frequency control unit, reference numeral 710 represents a RAM, and reference numeral 720 represents a ROM.

The operation of making the video clock frequency variable in PLL 51 will be described.

The output signal 140 of the crystal oscillator 50 divided by M by the 1/M frequency divider 702 and the video clock signal divided by N by the 1/N frequency divider 706 are input to the phase comparator 703 whose output is supplied via the low-pass filter 704 to the voltage controlled oscillator 705.

For example, if the phase of the output signal 140 of the crystal oscillator 50 frequency-divided by M advances from the phase of the video clock signal 150 frequency-divided by N, the input voltage to the voltage controlled oscillator 705 is raised to advance the phase of the video clock signal 150.

If the frequency of the output signal 140 of the crystal oscillator 500 is represented by fin, and that of the video clock signal 150 by fout, then the following equation is satisfied:

$$fout = fin \times N/M \qquad (1)$$

The value of N/M is adjusted in accordance with a detected main scan width to thereby make variable the video clock frequency.

As the value N is made large, the frequency of the output signal from the frequency divider 706 lowers so that the number of phase comparison times by the phase compartor 703 reduces and the jitter becomes large. In this embodiment, therefore, the feedback amount is increased by the following manner to reduce the jitter.

For example, in the case of "main scan width of reference color=300000 μm (300 nm)", "main scan width of adjustment color=300003 μm" and "N/M of adjustment color=952/949", then the N/M of adjustment color is set to "N/M=955/952.

In the case of "main scan width of reference color=300000 μm (300 nm)", "main scan width of adjustment color=299997 μm" and "N/M of adjustment color=952/949", then the N/M of adjustment color is set to "N/M=949/946. In this manner, as compared to N set nearly equal to 100000, the feedback amount can be increased about 100 times and the jitter can be reduced.

As described above, by properly switching between both the frequency division ratios M and N of the two frequency dividers 702 and 706, the frequency division ratios can be lowered. Therefore, without increasing the jitter, the video clock frequency can be adjusted finely. A high quality image with corrected color aberration can therefore be formed inexpensively and with high precision.

An example of the method of determining the values M and N of this embodiment will be described.

The frequency division ratio $K_k$ of the 1/M frequency divider 702 and that $N_k$ of the 1/N frequency divider 706 can be calculated from the following equations:

$$N_k = N_o + kb$$

$$K_k = M_o + kb \qquad (2)$$

where b, c and k an integer and $N_o$ and $M_o$ are a natural number. For example, assuming that "b=−3", "c=−3" and "$M_o=N_o+3$", then it becomes:

$$N_k = N_o - 3k$$

$$K_k = N_o + 3 - 3k$$

Consider now the case that k=0 is changed to k=1. The video clock frequency variable pitch is given by the following:

$$\{(N_1/M_1) - (N_o/M_o)\}/(N_o/M_o) \qquad (3)$$

where $M_1 = N_o$ and $N_1 = N_o - 3$.

In this embodiment, a desired video clock frequency variable pitch is 0.001%. The values of $N_o$ and $M_o$ calculated so that the absolute value of the equation (3) becomes 0.001% are $N_o$ of about 949 and $M_o$ of about 952. In this case, when k=0 changes to k=1, then $N_1$ is 946 and $M_1$ is 949 and the video clock frequency variable pitch is 9.99 ppm. A shift from the desired video clock frequency variable pitch is 0.01 ppm. The values of the variables of the equation (2) are determined so that the desired video clock frequency variable pitch is obtained and the shift from the video clock frequency variable pitch is in a desired range. In the equations (2), the c and k may be an integer and b, $N_o$ and $M_o$ may be a natural number.

As described above, the frequency division ratios M and N are calculated from the above equations. Instead, combinations of the frequency division ratios M and N of the frequency dividers may be calculated in advance and stored in a memory to read the stored combinations of the frequency division ratios and change the video clock frequency. This embodiment will be described in the following.

With reference to FIG. 11, an example of combinations of M and N will be described assuming that the video clock frequency variable step (pitch) is 35 ppm.

FIG. 11 is a diagram showing an example of a frequency division ratio combination table stored in ROM 1030 shown in FIG. 10.

Combinations of the frequency division ratios M and N are shown in the left columns and the video clock frequency variable step used when the frequency division ratios are changed are shown in the right column.

Combinations of the frequency division ratios M and N are calculated in advance and stored in ROM/RAM 1030 shown in FIGS. 6 and 10. Upon instruction from CPU 1017, the video clock frequency control circuit 1031 reads the values of M and N to change the video clock frequency.

Consider for example the case wherein M=1134 and N=1168. If it becomes necessary to reduce the main scan width by 35 ppm, the video clock frequency control circuit 1031 shown in FIG. 10 reads M=1066 and N=1098 from ROM/RAM 1030 and sets these values to the 1/M frequency divider 702 and 1/N frequency divider 706. Conversely, if it becomes necessary to increase the main scan width by 35 ppm, the video clock frequency control circuit 1031 reads M=935 and N=963 from ROM/RAM 1030 and sets these values to the 1/M frequency divider 702 and 1/N frequency divider 706.

If the number of combinations of the frequency division ratios M and N to be stored in the memory is increased, the variable range of the video clock frequency can be widened.

The operation of the circuit 51 shown in FIG. 9 will be described specifically.

A clock signal generated by the crystal oscillator 50 is input to PLL 51.

The clock signal (video clock signal) output from PLL 51 is input to the horizontal synchronization unit (BD synchronization unit) 52. The BD synchronization unit 52 is made of an IC and synchronizes the clock with the horizontal synchronization signals (BD signals 95a, 95b) at a precision of "1/L" dot. In the inside of the IC, the clock signal (video clock) generated by the crystal oscillator 50 and multiplied by L by PLL 51 is frequency-divided by L, so as to synchronize with the BD signals 95a and 95b output from the BD sensors 86a and 86b, to thereby obtain clock signals 94a and 94b. The clock signals 94a and 94b output from the BD synchronization unit 52 are input to the laser drive units 53a and 53b and used for reading image data in the controller 1001. Synchronously with the clock signals 94a and 94b, the laser drive units 53a and 53b modulate and drive the semiconductor lasers 54a and 54b with image data. This image data is read, under the control of CPU 1017, from the memory of the controller 1001 synchronously with the clock signals 94a and 94b in accordance with the main scan correction timings stored in ROM/RAM 1030.

This circuit shown in FIG. 9 is provided for each of four colors k, c, m and y. By correcting the video clock frequency of each color, the main scan magnification for each color can be made equal and the color aberration can be reduced.

With this configuration, the frequency of the clock signal input to PLL 51 can be raised by PLL 51. Therefore, the oscillation frequency of the crystal oscillator 50 may be lowered more than that of the video clock signal input to the BD synchronization unit 52, and the frequency at PLL 51 may be raised. In this manner, radiation noises can be reduced.

Since the difference of the main scan magnification between beams of the same color (laser beams generated by the semiconductor lasers 54a and 54b of the semiconductor laser array 400) is eliminated, the difference of the main scan magnification of each color can be eliminated. An image of high quality without color aberration can therefore be formed. More specifically, in this embodiment, the clock is generated by PLL common for a plurality of laser beams, and the phase of this clock is controlled in accordance with the BD signal of each laser beam to thereby generate a video clock for each beam. Furthermore, as shown in FIG. 8, each optical system is provided with the toric lens 36 and composite optical element 37. In this manner, the difference of the scan magnification between a plurality of light beams can be eliminated.

In the above-described first embodiment, the frequency of the video clock signal for each color k, c, m and y is made variable, and the frequency of the video clock signal for each color is adjusted so as to make equal the scan magnification of each color. Instead, the frequency of the video clock signal of a reference color may be fixed. In this case, the frequency of the video clock signal for each of the other colors is made variable and adjusted so as to make the scan magnifications for the other colors equal to that of the reference color. The second embodiment realizing such the case will be described in the following.

Figure 12:
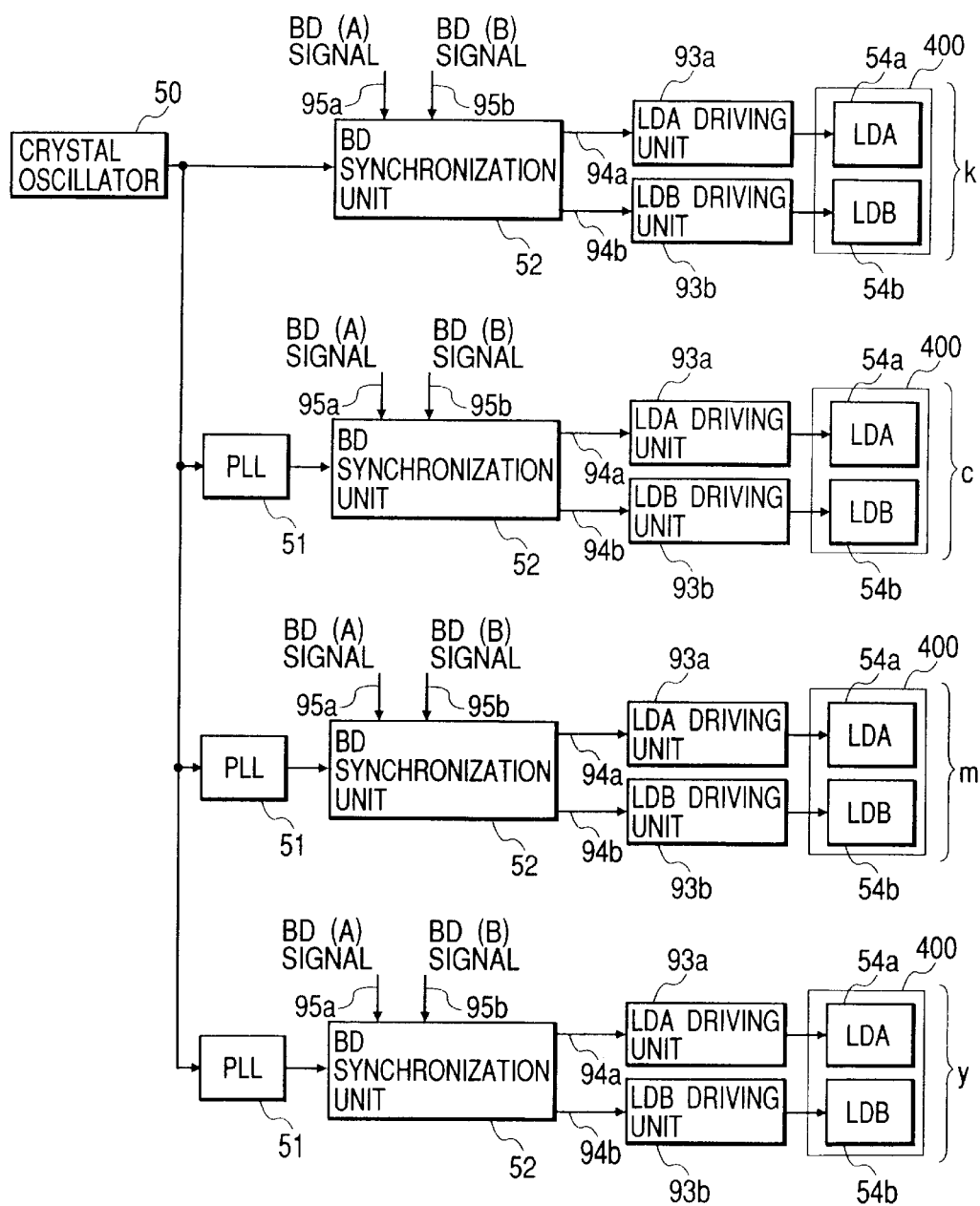
FIG. 12 is a diagram showing another example of the structure of the printer engine shown in FIG. 6.

FIG. 12 is a block diagram showing the structure of the second embodiment of the invention. In FIG. 12, like elements to those shown in FIG. 9 are represented by using the identical reference numerals.

As shown in FIG. 12, a video clock generating unit for the main scan magnification reference color (in this embodiment, black (k)) does not contain PLL 51 for changing the clock frequency, and the clock signal (video clock) having always a constant frequency generated by the crystal oscillator 50 is input to the BD synchronization unit 52. The structure for the other colors (cyan (c), magenta (m) and yellow (y)) other than the reference color is the same as that of the first embodiment, and the frequency of the video clock signal can be made variable by PLL 51. The oscillation frequency of the crystal oscillator 50 is set assuming that the mechanical components are disposed ideally.

Specifically, the laser scanner optical system for the reference color is provided with a video clock generator unit with a fixed frequency, and the laser scanner optical system for the other colors is provided with a video clock generator unit with a variable frequency.

For example, black (k) is used as the main scan magnification reference color. In this case, CPU 1017 controls the frequency division ratio N/M of PLL 51 of each of the other colors including cyan (c), magenta (m) and yellow (y) so that PLL 51 adjusts the video clock frequency and makes the main scan magnifications of the other colors become equal to that of the reference color.

In this manner, the main scan magnification of each of the cyan (c), magenta (m) and yellow (y) can be made equal to that of the black (k) and an image of high precision without color aberration can be formed.

The number of PLLs 51 used for generating the video clock signal can be reduced so that an image of high precision can be formed more inexpensively.

Next, the third embodiment of the invention will be described.

In the third embodiment, PLL 51 for changing the video clock frequency supplies the clock signal (video clock) to the BD synchronization unit 52, the clock signal having the N-fold frequency of that of the video clock to be supplied to the laser driver units 93a and 93b. The video clock having the N-fold frequency is divided by N by the BD synchronization unit and supplied to the laser driver units 93a and 93b. This configuration will be described.

The video clock generator unit of the third embodiment will be described with reference to FIG. 9 showing the first embodiment. In the third embodiment, the BD synchronization is assumed to be ¼ dot.

The clock signal output from the crystal oscillator 50 is input to PLL 51. PLL 51 outputs a video clock signal having a 4-fold frequency of the frequency which makes equal the main scan magnification on the scan line of each beam. The video clock output from PLL 51 is input to the BD synchronization unit 52. The BD synchronization unit divides the frequency of the video clock signal input from PLL, so as to synchronize with the BD(A) signal 95a and BD(B) signal 95b, to thereby generate video clock signals for the semiconductor lasers (LDA 81a and LDB 81b).

The structures of the other video generator units for other colors are the same as that of the unit described above.

The BD synchronization precision of ¼ dot has been used above. This precision is determined from a requested image quality, and may be a precision of ½ dot or ⅛ dot.

With the above configuration, it is unnecessary for the BD synchronization unit 52 to multiply the video clock supplied from PLL 51. Generally, jitter of a clock increases if the frequency thereof is changed by PLL. Therefore, it is preferable that the number of PLLs in the video clock generator unit is small. In the third embodiment, only one PLL is used in the video clock generator unit so that the jitter can be minimized and an image of high precision can be formed.

By providing a plurality of photosensitive members corresponding to a plurality of laser scanner optical systems, an image can be formed with a plurality of colors at the same time and at high speed.

Furthermore, a single laser scanner optical system has a plurality of laser sources, and the beams emitted from each laser source pass through the same optical system and become incident upon the photosensitive member. Therefore, a plurality of lines can be scanned at the same time and an image can be formed at high speed.

Further, since the laser source is modulated with video signals, a desired image can be formed.

Still further, at least one of the units for generating the clock signal (video clock) for video signals makes the clock frequency variable so that the main scan magnification can be adjusted. An image with less color aberration can therefore be formed at high speed.

The laser source of one laser scanner optical system is a semiconductor laser array forms in which, on a single chip, a plurality of lasers are formed. Therefore, there is hardly a difference of the wavelength between laser beams so that it is possible to avoid a difference of the main scan magnification caused by the difference of the beam wavelength.

Each beam of the same optical system passes through generally same areas of the system and is applied to a photosensitive member. It is therefore possible to avoid a difference of the main scan width caused by an optical path difference. Namely, there is hardly a difference of the main scan width between beams of the same optical system. Therefore, some or all of the video clock signals for the laser sources of the same optical system can be used in common and an image of high precision with less color aberration can be formed at high speed.

Since the video clock generator unit has PLL, the video clock frequency can be changed with high precision by using combinations of PLL frequency division ratios. It is therefore possible to correct color aberration with high precision.

The frequency of the video clock signal output from PLL is divided to generate the video clock signals for video signals. It is therefore unnecessary for horizontal synchronization to multiply the clock frequency at the PLL. It is also possible to avoid degraded jitter of the clock signal to be caused by a plurality of PLLs. An image of high precision can therefore be formed.

The video clock generator unit for the main scan magnification reference color has no video clock frequency variable unit (PLL), and the main scan magnification of other colors different from the reference color is adjusted to correct the color aberration of the image. Since the structure of the video clock generator unit for the reference color is simplified, the color aberration can be corrected with high precision and with low cost.

The adjustment of the main scan magnification of the above embodiments is executed at proper timings. For example, it is preferable to execute such adjustment, during the period after one sheet is printed and until the next sheet is printed, after a lapse of a predetermined time, when the image forming apparatus is initiated, after the image forming unit is exchanged, after the case of the image forming apparatus is opened or closed, or when the apparatus is adjusted before shipping from the factory. The adjustment before shipping from the factory is expected to be low cost more than the mechanical adjustment for optical components, scanner and the like.

The adjustment timings may be set by a user by using the operation unit 1021 or host computer 2000.

In the above embodiments, although the image forming units for four colors are used, the invention is applicable also to image forming units for two colors or three colors.

The invention is also applicable to image forming units for five or more colors.

A laser scanner optical system of a monochrome image forming apparatus may be used which has the crystal oscillator 50, BD synchronization unit 52, a plurality of laser driver units, semiconductor laser array 400 having a plurality of laser sources on a single chip, BD sensors 86*a* and 86*b* and the like. At least two laser sources in the semiconductor laser array 400 generate laser beams synchronously with the clock signals 94*a* and 94*b* generated by synchronizing the common (same) clock signal (video clock) input to the BD synchronization unit 52 with the BD signals 95*a* and 95*b* output from the BD sensors 86*a* and 86*b*.

In the first to third embodiment, all the laser sources in the semiconductor laser array on a single chip generate laser beams synchronously with the clock signals 94*a* and 94*b* generated by synchronizing the common (same) clock signal (video clock) input to the BD synchronization unit 52 with the BD signals 95*a* and 95*b* output from the BD sensors 86*a* and 86*b*. Instead, at least two laser sources may generate laser beams synchronously with the clock signals 94*a* and 94*b* generated by synchronizing the common (same) clock signal (video clock) input to the BD synchronization unit 52 with the BD signals 95*a* and 95*b* output from the BD sensors 86*a* and 86*b*.

In the above embodiments, the reason why the main scan magnification of each of the colors k, c, m and y is attributed to a change in the distance between the scanner and photosensitive member. The reason is not limited only thereto, but there may be other reasons such as a position displacement of optical components, a refraction change or deformation of a lens or the like. The invention is applicable to the case wherein the main scan magnification is changed by such reasons.

Although the above embodiments are used for correcting the main scan magnification, they may also be used for positively and finely adjusting the main scan magnification, such as adjusting the image magnification.

In the above embodiments, although the laser scanner and photosensitive member are in one-to-one correspondence, they may be in other relations. For example, an endless photosensitive member or a drum photosensitive member may be used so that the image forming unit can be constituted of a plurality of laser scanner optical systems and a single photosensitive member. This invention is also applicable to such a case.

In the above embodiments, although the main clock for PLLs is generated by the single crystal oscillator 50, the invention is not limited to a single crystal oscillator. For example, each PLL may be provided with a crystal oscillator, or some PLLs may be provided with a common crystal oscillator.

In the above embodiments, although the laser source is formed in the end facet emission type semiconductor laser array, other semiconductor laser arrays may be used such as a vertical resonance facet emission type semiconductor laser array having a plurality of semiconductor laser sources on one laser chip.

In the above embodiments, although PLL is used as the video clock frequency variable unit, this unit may be made of a voltage controlled oscillator (VCO) and other components. The oscillation frequency of VCO changes with an input voltage so that the input voltage is changed in accordance with the correction amount of the frequency. If a voltage controlled crystal oscillator or the like having a small jitter is used as VCO, a video clock signal with a small jitter can be generated.

In the above embodiments, although the number of laser sources of a single optical system is two, the number of laser sources may be increased more to speed up the image forming operation.

As described so far, according to the present invention, the common video clock is used for all the laser sources in the single laser scanner optical system, and one PLL in each laser scanner optical system changes the video clock frequency. Accordingly, color aberration can be corrected with high precision and an image of high precision with less color aberration can be formed inexpensively at high speed.

Further, the BD sensors detect each scanned laser beam at predetermined positions, and output horizontal synchronization signals of the beam. The BD synchronization unit divides the frequency of the clock output from PLL to generate the video clock signal synchronizing with each of the horizontal synchronization signals of each beam. It is therefore possible to form an image of high precision having a small jitter of the video clock signal.

The video clock generator unit for the main scan magnification reference color generates a video clock signal having a fixed frequency. It is therefore possible to correct the color aberration inexpensively.

In the above embodiments, although the present invention is applied to a color printer, the invention is also applicable to other apparatus such as a color copy machine and a color facsimile so long as they can form a superposed image by making a plurality of scanner optical systems scan and expose a plurality of photosensitive members with light beams modulated by input image signals.

It is obvious that the object of the invention can be achieved by supplying a system or apparatus with a storage medium storing software program codes realizing the functions of each embodiment described above, and by reading and executing the programs codes stored in the storage medium by a computer (CPU or MPU) of the system and apparatus.

In such a case, the program codes themselves read from the storage medium realize the novel functions of the invention. Therefore, the storage medium storing such program codes constitutes the present invention.

The storage medium for storing such program codes may be a floppy disk, a hard disk, an optical disk, a magnetooptical disk, a CD-ROM, a CD-R, a magnetic tape, a nonvolatile memory card, a ROM, an EEPROM or the like.

It is obvious that the scope of the invention also contains not only the case wherein the functions of each embodiment can be realized by executing the program codes read by a computer, but also the case wherein the functions of each embodiment can be realized by executing a portion or the whole of processes by an OS running on the computer, in accordance with the program codes.

It is obvious that the scope of the invention also contains the case wherein the functions of each embodiment can be realized by writing the program codes read from the storage medium into a memory of a function expansion board inserted into a computer or of a function expansion unit connected to the computer, and thereafter by executing a portion or the whole of actual processes by a CPU of the function expansion board or function expansion unit.

The invention may be applied to a system constituted of a plurality of apparatus or to a single apparatus. It is obvious that the invention is applicable to the case wherein a program is supplied to the system or apparatus to realize the functions of the invention. In such a case, by reading software program codes from a storage medium, the system or apparatus can obtain the advantageous effects of the invention.

By downloading software programs realizing the functions of the invention from a database on a network by using a communication program, the system or apparatus can obtain the advantageous effects of the invention.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image forming apparatus, comprising:

an image forming unit including an image bearing member, beam generating means for generating a plurality of light beams and an optical scan system for scanning the image bearing member with the plurality of light beams generated by said beam generating means to write an image;

beam detecting means for detecting the plurality of light beams scanning the image bearing member at predetermined positions and obtaining a plurality of beam detection signals;

clock generating means for generating a single clock signal;

control means for controlling the frequency of the single clock signal by controlling said clock generating means; and synchronization means for controlling the phase of the single clock signal generated by said clock generating means in accordance with the plurality of beam detection signals obtained by said beam detecting means, and generating a plurality of control clocks, wherein said beam generating means generates the plurality of light beams in accordance with the plurality of control clocks, and wherein said clock generating means includes a reference oscillator and PLL circuit to which an output of said reference oscillator is input.

2. An apparatus according to claim 1, wherein said PLL circuit includes: a first frequency divider for dividing the frequency of the output of said reference oscillator by N, which is an integer; a phase comparator to which an output of the first frequency divider is input as one input; a filter to which an output of the phase comparator is input; an oscillator for outputting a signal having a frequency corresponding to an output of the filter; and a second frequency divider for dividing the frequency of an output of the oscillator by M, which is an integer, and outputting a signal as another input of the phase comparator, wherein said control means controls the frequency of the single clock signal by changing a frequency division ratio N of the first frequency divider and a frequency division ratio M of the second frequency divider.

3. An apparatus according to claim 2, wherein said control means includes a memory for storing a plurality of combinations of a value of the frequency division ratio N and a value of the frequency division ratio M, and selects one of the plurality of combinations in accordance with a main scan magnification shift amount of the image formed by said image forming unit to change the frequency division ratios N and M.

4. An apparatus according to claim 1, wherein said optical scan system includes magnification compensation means provided along an optical path of said optical scan system for compensating for a shift of a focussed image position in a main scan direction caused by a variation of a wavelength of the light beam.

5. An apparatus according to claim 1, wherein said beam generating means is modulatedly driven in accordance with the plurality of control clocks and image data read from a memory in accordance with the plurality of control clocks.

6. An apparatus according to claim 1, wherein the single clock signal has an N-fold frequency of the frequency of each of the plurality of control clocks, and said synchronization means divides the frequency of the single clock signal by N in accordance with the plurality of beam detection signals, to generate the plurality of control clocks.

7. An apparatus according to claim 1, wherein said beam generating means includes a light source unit having a plurality of light sources on a same substrate for generating light beams synchronously with the plurality of control clocks.

8. An image forming apparatus, comprising:
a plurality of image forming units each including an image bearing member, beam generating means for generating a plurality of light beams, an optical scan system for scanning the image bearing member with the plurality of light beams generated by said beam generating means to write an image, and beam detecting means for detecting the plurality of light beams scanning the image bearing member at predetermined positions and obtaining a plurality of beam detection signals;
a plurality of clock generating means each generating a single clock signal for said plurality of image forming units;
control means for controlling a frequency of the single clock signal by controlling said plurality of clock generating means; and
a plurality of synchronization means for controlling a phase of the single clock signal generated by said plurality of clock generating means in accordance with the plurality of beam detection signals obtained by said beam detecting means of said plurality of image forming units, and generating a plurality of control clocks,
wherein each of said beam generating means of said plurality of image forming units generates the plurality of light beams in accordance with the plurality of control clocks, and wherein said clock generating means includes a reference oscillator and PLL circuit to which an output of said reference oscillator is input.

9. An apparatus according to claim 8, further comprising:
shift detecting means for detecting a magnification shift amount between images formed by said plurality of image forming units,
wherein said control means controls the frequency of said clock signal in accordance with the magnification shift amount detected by said shift detecting means.

10. An apparatus according to claim 8, wherein said PLL circuit includes: a first frequency divider for dividing the frequency of the output of said reference oscillator by N, which is an integer; a phase comparator to which an output of the first frequency divider is input as one input; a filter to which an output of the phase comparator is input; an oscillator for outputting a signal having a frequency corresponding to an output of the filter; and a second frequency divider for dividing the frequency of an output of the oscillator by M, which is an integer, and outputting a signal as another input of the phase comparator, wherein said control means controls the frequency of the single clock signal by changing a frequency division ratio N of the first frequency divider and a frequency division ratio M of the second frequency divider.

11. An apparatus according to claim 10, wherein said control means includes a memory for storing a plurality of combinations of a value of the frequency division ratio N and a value of the frequency division ratio M, and selects one of the plurality of combinations in accordance with a magnification shift amount to change the frequency division ratios N and M.

12. An apparatus according to claim 8, wherein each of said optical scan system of said plurality of image forming units includes magnification compensation means provided along an optical path of said optical scan system for compensating for a shift of a focussed image position in a main scan direction caused by a variation of a wavelength of the light beam.

13. An apparatus according to claim 8, wherein each of said beam generating means of said plurality of image forming units is modulatedly driven in accordance with the plurality of control clocks and image data read from a memory in accordance with the plurality of control clocks.

14. An apparatus according to claim 8, wherein the single clock signal has an N-fold frequency of the frequency of each of the plurality of control clocks, and said synchronization means divides the frequency of the single clock signal by N in accordance with the plurality of beam detection signals, to generate the plurality of control clocks.

15. An apparatus according to claim 8, wherein said beam generating means of said plurality of image forming units includes a light source unit having a plurality of light sources on a same substrate for generating light beams synchronously with the plurality of control clocks.

16. An image forming apparatus, comprising:
a plurality of image forming units each including an image bearing member, a beam generator for generating a plurality of light beams, an optical scan system for scanning the image bearing member with the plurality of light beams generated by said beam generator to write an image, and a beam detector for detecting the plurality of light beams scanning the image bearing member at predetermined positions and for obtaining a plurality of beam detection signals;
a plurality of clock generators each generating a single clock signal for other image forming units other than a predetermined image forming unit among said plurality of image forming units;
a controller for controlling a frequency of the single clock signal by controlling said plurality of clock generators;
a plurality of first synchronization units for controlling a phase of the single clock signal generated by said plurality of clock generators in accordance with the plurality of beam detection signals obtained by said beam detectors of said plurality of image forming units, and generating a plurality of control clocks; and
a second synchronization unit for controlling the phase of a reference clock having a predetermined frequency in accordance with the plurality of beam detection signals obtained by said beam detector of said predetermined image forming unit, and generating a plurality of control clocks to be output to said beam generator of the predetermined image forming unit,
wherein each of said beam generators of said plurality of image forming units generates the plurality of light beams in accordance with the plurality of control clocks.

17. An image forming apparatus, comprising:
a plurality of image forming units each including an image bearing member, a beam generator for generating a plurality of light beams, an optical scan system for scanning the image bearing member with the plurality of light beams generated by said beam generator to write an image, and a beam detector for detecting the plurality of light beams scanning the image bearing member at predetermined positions and obtaining a plurality of beam detection signals;

a plurality of clock generators each generating a single clock signal for other image forming units other than a predetermined image forming unit among said plurality of image forming units;

a controller for controlling a frequency of the single clock signal by controlling said plurality of clock generators;

a plurality of synchronization units for controlling a phase of the single clock signal generated by said plurality of clock generators in accordance with the plurality of beam detection signals obtained by said beam detectors of said plurality of image forming units, and generating a plurality of control clocks; and a shift detector for detecting a magnification shift amount of each image formed by said predetermined image forming unit from each image formed by said other image forming units, wherein each of said beam generators of said plurality of image forming units generates the plurality of light beams in accordance with the plurality of control clocks, and wherein said controller controls the frequency of said clock signal in accordance with the magnification shift amount detected by said shift detector.

18. An image forming apparatus, comprising:

a plurality of image forming units each including an image bearing member, a beam generator for generating a plurality of light beams, an optical scan system for scanning the image bearing member with the plurality of light beams generated by said beam generator to write an image, and a beam detector for detecting the plurality of light beams scanning the image bearing member at predetermined positions and obtaining a plurality of beam detecting signals;

a plurality of clock generators each generating a single clock signal for other image forming units other than a predetermined image forming unit among said plurality of image forming units;

a controller for controlling a frequency of the single clock signal by controlling said plurality of clock generators;

a plurality of synchronization units for controlling a phase of the single clock signal generated by said plurality of clock generators in accordance with the plurality of beam detection signals obtained by said beam detectors of said plurality of image forming units, and generating a plurality of control clocks;

a shift detector for detecting a magnification shift amount of each image formed by said predetermined image forming unit from each image formed by said other image forming units; and a moving member for moving images formed by said plurality of image forming units and transferring the images at a transfer position, wherein each of said beam generators of said plurality of image forming units generates the plurality of light beams in accordance with the plurality of control clocks, wherein said controller controls the frequency of said clock signal in accordance with the magnification shift amount detected by said shift detector, and wherein said shift detector includes a sensor for reading a plurality of registration images formed by said plurality of image forming units and transferred to said moving member, and the shift amount is detected from an output of said sensor.

19. An image forming apparatus comprising:

a first image formation unit arranged to scan a first beam and a second beam on a first photoreceptor;

a second image formation unit arranged to scan a third beam and a fourth beam on a second photoreceptor;

a transferring unit arranged to transfer an image formed by said first image formation unit and an image formed by said second image formation unit to a common recording medium;

a reference oscillator arranged to generate a single clock signal;

a frequency control unit arranged to generate a primary clock signal for said first image formation unit, and a secondary clock signal for said second image formation unit, based on the single clock signal generated by said reference oscillator, wherein a frequency of the secondary clock signal is different from a frequency of the primary clock signal;

a first phase control unit arranged to generate a first clock signal for modulating the first beam and a second clock signal for modulating the second beam, based on the primary clock signal by independently controlling a phase of the primary clock signal; and a second phase control unit arranged to generate a third clock signal for modulating the third beam and a fourth clock signal for modulating the fourth beam, based on the secondary clock signal by independently controlling a phase of the secondary clock signal.

20. An image forming apparatus according to claim 19, wherein said first and second image formation units form images of different colors respectively.

21. An image forming apparatus according to claim 19, wherein the frequency of the primary clock signal for said first image formation unit is equal to a frequency of the single clock signal generated by said reference oscillator.

22. An apparatus according to claim 21, wherein said first image formation unit forms a black image.

23. An apparatus according to claim 19, wherein said frequency control unit comprises a phase-locked loop circuit.

24. An apparatus according to claim 19, wherein said frequency control unit comprises a frequency modifying unit arranged to modify a frequency of an input clock signal so as to increase the frequency thereof by M/N times, M and N being integers.

25. An apparatus according to claim 24, further comprising a setting unit arranged to set M and N.

26. An apparatus according to claim 25, further comprising a storage unit arranged to store M and N for each of said first and second image formation units.

27. An image forming apparatus comprising:

a first image formation unit arranged to scan a first beam and a second beam on a first photoreceptor;

a second image formation unit arranged to scan a third beam and a fourth beam on a second photoreceptor;

a transferring unit arranged to transfer an image formed by said first image formation unit and an image formed by said second image formation unit to a common recording medium;

a reference oscillator arranged to generated a single clock signal; and a generating unit arranged to independently generate first, second, third and fourth clock signals for modulating the first beam, second beam, third beam and fourth beam, respectively, based on the single clock signal generated by said reference oscillator, wherein a frequency of the second clock signal is equal to a frequency of the first clock signal, a frequency of the fourth clock signal is equal to a frequency of the third clock signal, and the frequency of the third clock signal is independent of the frequency of the first clock signal, and wherein a phase of each of the first, second, third and fourth clock signals is controlled independently based on a synchronization signal.

28. A control apparatus for an image forming apparatus having a plurality of image forming units, each image forming unit arranged to scan a plurality of beams on a photoreceptor in accordance with image data transmitted from said control apparatus, and a transferring unit arranged to transfer images formed on the photoreceptor by each of the plurality of image forming units to a common recording medium, said control apparatus comprising:

a memory unit arranged to store image data;

a reading unit arranged to read out image data from said memory unit and to transmit read image data to each of the plurality of image forming units for modulating each of the plurality of beams; and a generating unit arranged to generate a plurality of reading clocks for reading out image data from said memory unit, wherein frequencies of reading clocks for a common image forming unit are equal, a frequency of a reading clock for one of the plurality of image forming units differs from a frequency of a reading clock for another of the plurality of image forming units, and a phase of a reading clock for each of the plurality of beams is controlled based on a synchronization signal.

29. A control apparatus according to claim 28, wherein said generating unit generates the plurality of reading clocks based on a single clock generated by a reference oscillator.

30. A control apparatus according to claim 29, wherein said generating unit comprises a phase-locked loop circuit.

31. A control apparatus according to claim 30, wherein said generating unit comprises a frequency modifying unit arranged to modify a frequency of an input clock signal so as to increase the frequency thereof by M/N times, M and N being integers.

32. A control apparatus according to claim 28, wherein said generating unit comprises a phase controlling unit arranged to control a phase of at least one of the plurality of reading clocks based on registration data.

* * * * *

UNITED STATES PATENT AND TRADEMARK OFFICE
CERTIFICATE OF CORRECTION

PATENT NO. : 6,493,019 B1
DATED : December 10, 2002
INVENTOR(S) : Hideaki Hirasawa It is certified that error appears in the above-identified patent and that said Letters Patent is hereby corrected as shown below:

Column 2,
Line 18, "he" should read -- the --.

Column 3,
Line 40, "(k)." should read -- (k) --.

Column 4,
Line 1, "According" should read -- According to --.

Column 12,
Line 1, "k an integer" should read -- k are integers --; and "a" should be deleted; and
Line 2, "number" should read -- numbers --.

Column 17,
Line 31, "programs" should read -- program --.

Column 22,
Line 63, "generated" should read -- generate --.

Signed and Sealed this

Fifteenth Day of July, 2003

JAMES E. ROGAN
*Director of the United States Patent and Trademark Office*